(12) United States Patent
Sawaki

(10) Patent No.: US 8,350,992 B2
(45) Date of Patent: Jan. 8, 2013

(54) POLARIZATION ELEMENT AND PROJECTOR

(75) Inventor: Daisuke Sawaki, Shiojiri (JP)

(73) Assignee: Seiko Epson Corporation (JP)

( * ) Notice: Subject to any disclaimer, the term of this patent is extended or adjusted under 35 U.S.C. 154(b) by 199 days.

(21) Appl. No.: 12/893,398

(22) Filed: Sep. 29, 2010

(65) Prior Publication Data

US 2011/0115991 A1    May 19, 2011

(30) Foreign Application Priority Data

Nov. 16, 2009 (JP) ................................. 2009-260713
Jul. 16, 2010 (JP) ................................. 2010-161725

(51) Int. Cl.
*G02F 1/1335* (2006.01)
(52) U.S. Cl. ..................... 349/96; 359/487.03
(58) Field of Classification Search .................... 349/96; 359/487.03
See application file for complete search history.

(56) References Cited

U.S. PATENT DOCUMENTS

| 7,233,563 B2 | 6/2007 | Ueki et al. | |
| 7,755,718 B2 | 7/2010 | Amako et al. | |
| 7,972,017 B2 * | 7/2011 | Amako et al. | 353/98 |
| 2011/0205457 A1 * | 8/2011 | Sawaki | 349/5 |
| 2011/0205458 A1 * | 8/2011 | Sawaki | 349/5 |

FOREIGN PATENT DOCUMENTS

| JP | 2005-037900 | 2/2005 |
| JP | 2006-133275 | 5/2006 |
| JP | 2009-064005 | 3/2009 |

* cited by examiner

*Primary Examiner* — James Dudek
(74) *Attorney, Agent, or Firm* — Harness, Dickey & Pierce, P.L.C.

(57) ABSTRACT

A polarization element includes: a substrate; a plurality of thin metal wires provided to the substrate in a striped manner; and a plurality of protruding sections made of metal provided to each of the thin metal wires, and arranged in a longitudinal direction of the thin metal wire at a pitch shorter than a wavelength of incident light.

15 Claims, 10 Drawing Sheets

POLARIZATION ELEMENT AND PROJECTOR

BACKGROUND

1. Technical Field

The present invention relates to a polarization element and a projector.

2. Related Art

Recent years, wire grid polarization elements have been known as optical elements having a polarization separation function. The wire grid polarization elements are each obtained by forming nanoscale thin metal wires on a transparent substrate such as a glass substrate so as to line the substrate with the metal wires. The wire grid polarization elements have a characteristic of having a high polarization separation performance, and in addition, being superior in heat resistance to polarization elements made of organic materials since the wire grid polarization elements are made of inorganic materials. Therefore, use of wire grid polarization elements instead of polarization separation elements in the related art made of polymeric materials is considered in various optical systems. Specifically, the wire grid polarization elements are preferably used as polarization elements for light valves of liquid crystal projectors exposed to the light from high power light sources, and are disposed in front of and behind (at lest either one of the light entrance side and the light exit side) the light valves.

Incidentally, in the light exit side of the light valves, the function of absorbing the unwanted polarized light is required. This is because, if the unwanted polarized light is reflected by the light exit side of the light valve, there might arise a problem that the reflected light enters the light valve again to cause temperature rise in transistors, which makes the grayscales out of order, or to become stray light, which degrades the image quality.

Therefore, there has been considered various types of wire grid polarization elements of an absorption type provided with a function of absorbing the unwanted polarized light. For example, in JP-A-2005-37900 (Document 1), the unwanted polarized light is selectively absorbed by a polarization element having a first grating layer with light reflecting property formed on a substrate attached with a second grating layer (an absorbing layer) with a light absorbing property.

On the other hand, in JP-A-2006-133275 (Document 2), there is proposed a polarization element having a light transmissive substrate having steps formed on the surface with a pitch longer than the wavelength of the incident light, and light reflecting bodies arranged on the surface of the light transmissive substrate in a striped manner with a pitch shorter than the wavelength of the incident light. Thus, the stray light is prevented from occurring by reflecting the unwanted polarized light component with an angle but not specularly.

However, in Document 1, since deposition of the absorbing layer is required in addition to formation of the polarization element, and therefore, the structure of the element becomes complicated, the manufacturing cost rises. Further, in Documents 1 and 2, there is no description regarding the technology of absorbing the unwanted polarized light using surface plasmon resonance (SPR).

SUMMARY

An advantage of some aspects of the invention is to provide a polarization element and a projector capable of selectively absorbing unwanted polarized light to thereby be superior in grayscale expression, realize high-quality image display, and further simplify the element structure to achieve cost reduction.

According to an aspect of the invention, there is provided a polarization element including a substrate, a plurality of thin metal wires provided to the substrate in a striped manner, and a plurality of protruding sections made of metal provided to each of the thin metal wires, and arranged in a longitudinal direction of the thin metal wire at a pitch shorter than a wavelength of incident light.

According to this configuration, by adopting the resonant grating structure having the protruding sections arranged on the thin metal wires at a pitch shorter than the wavelength of the incident light, it becomes possible to develop the surface plasmon resonance (SPR) to thereby selectively absorb the linearly polarized light TE (unwanted polarized light) with a specific wavelength entering the polarization element. Specifically, when the linearly polarized light TE enters the resonant grating structure described above, the evanescent light is generated. The wave number thereof and the wave number of the surface plasmon can be made equal to each other using the evanescent light, and thus the surface plasmon can be excited. Since the energy of the incident light is consumed for the excitation of the surface plasmon, the reflection toward the entering direction of the light can be reduced. Therefore, it becomes possible to provide the polarization element capable of selectively absorbing unwanted polarized light to thereby be superior in grayscale expression, and realize high-quality image display. Further, since it is not required to provide the absorbing layer, which is provided in the case of Document 1, it becomes possible to simplify the element structure to thereby achieve cost reduction.

Further, in the polarization element of the above aspect of the invention, it is possible that a width of each of the protruding sections in the longitudinal direction of the thin metal wire and a distance between two adjacent ones of the protruding sections are respectively the same between the adjacent ones of the thin metal wires.

According to this configuration, it becomes easier for the evanescent wave to be generated compared to the case in which the protruding sections have a random periodicity. Thus, since it becomes easy for the surface plasmon to be excited, the energy of the incident light is consumed, and the reflection toward the entering direction of the light can sufficiently be reduced.

Further, in the polarization element of the above aspect of the invention, it is also possible that a distance from the thin metal wire to an upper surface of each of the protruding sections is set in accordance with the wavelength of the incident light.

According to this configuration, since the optimum value of the height of the protruding sections is different depending on the wavelength of the incident light, by appropriately designing the height to be the same or different, it is possible to obtain the polarization element having a preferable optical characteristic.

Further, in the polarization element of the above aspect of the invention, it is also possible that shapes of each of the thin metal wires and each of the protruding sections viewed from a direction parallel to a plane of the substrate are each a rectangular shape.

According to this configuration, the thin metal wires and the protruding sections each have a side-view rectangular shape, and are therefore, easy to be manufactured. Specifically, these constituents can easily be manufactured by forming the metal film on the substrate, and then performing anisotropic etching of reactive ion etching (RIE) thereon using the resist pattern as a mask. Therefore, it becomes possible to improve the production efficiency to thereby achieve the cost reduction.

According to another aspect of the invention, there is provided a projector including an illumination optical system adapted to emit a light beam, at least one liquid crystal light valve adapted to modulate the light beam, at least one polarization element according to the aspect of the invention described above, which the light beam modulated by the liquid crystal light valve enters, and a projection optical system adapted to project a polarized light beam transmitted through the polarization element on a projected surface.

According to this configuration, since the polarization element related to the above aspect of the invention is provided, the deterioration of the polarization element can be prevented even in the case of using a high-power light source. Therefore, there can be provided the projector superior in grayscale expression, capable of realizing high-quality image display, and achieving cost reduction.

Further, in the projector described above, it is also possible that the light beam emitted by the illumination optical system includes a plurality of colored light beams different in wavelength from each other, the liquid crystal light valves are disposed so as to correspond respectively to the colored light beams, and the polarization elements are different from each other in the distance from the upper surface of the thin metal wire to the upper surface of each of the protruding sections corresponding to the colored light beam modulated by the liquid crystal light valve, the thin metal wire and the protruding sections being included in each of the polarization elements.

According to this configuration, since the polarization elements designed in accordance with the plurality of colored light beams are used, it is possible to obtain a projector capable of controlling the transmission rate for each of the colored light beams, thereby performing excellent display.

According to still another aspect of the invention, there is provided a polarization element of a wire grid type including a substrate, a plurality of thin metal wires provided to the substrate in a striped manner, and a plurality of protruding sections made of metal provided to each of the thin metal wires, and arranged in a longitudinal direction of the thin metal wire at a pitch of no smaller than 300 nm and no larger than 700 nm, wherein the thin metal wires are arranged in a direction perpendicular to the longitudinal direction of the thin metal wire at a pitch of no smaller than 10 nm and no larger than 200 nm.

According to this configuration, since the protruding sections are arranged in the thin metal wires at a pitch of no smaller than 300 nm and no larger than 700 nm, it is possible to develop the surface plasmon resonance (SPR) with visible light. Since specific linearly polarized light TE (unwanted polarized light) out of the visible light entering the polarization element can selectively be absorbed, an application to the polarization element for visible light is possible. Further, since the thin metal wires are arranged in a direction perpendicular to the longitudinal direction of the thin metal wires at a pitch of no smaller than 10 nm and no larger than 200 nm, the superior polarization separation function can be developed. For example, if the arrangement pitch of the thin metal wires in the direction perpendicular to the longitudinal direction is set to be smaller than 10 nm, it becomes technically difficult to arrange the thin metal wires. Further, if the arrangement pitch of the thin metal wires in the direction perpendicular to the longitudinal direction exceeds 200 nm, the polarization separation performance is degraded, and the polarization element might no longer function as the wire grid polarization element.

Further, in the polarization element of the above aspect of the invention, it is also possible that the protruding sections are arranged in the longitudinal direction of the thin metal wire at a pitch of no smaller than 475 nm and smaller than 545 nm, and the height of each of the protruding sections is set to no lower than 10 nm and no higher than 50 nm.

According to this configuration, since the protruding sections are arranged on the thin metal wires at a pitch of no smaller than 475 nm and smaller than 545 nm, and the height of the protruding sections is set to no smaller than 10 nm and no larger than 50 nm, the surface plasmon resonance can be developed with the G light beam. Since the specific linearly polarized light TE (the unwanted polarized light) out of the G light beam entering the polarization element can selectively be absorbed, an application to the polarization element for the G light beam is possible. For example, if the pitch of the protruding sections becomes smaller than 475 nm, the peak of the absorption wavelength is shifted toward the shorter wavelength side, and enters the wavelength band of the B light beam. Further, if the pitch of the protruding sections exceeds 545 nm, the peak of the absorption wavelength is shifted toward the longer wavelength side, and enters the wavelength band of the R light beam. On the other hand, if the height of the protruding sections becomes lower than 10 nm, the reflectance is shifted to be increased, and the peak of the decrease in the reflectance becomes gentler, thereby making it harder to absorb the unwanted polarized light. Further, if the height of the protruding sections exceeds 50 nm, the peak of the absorption wavelength is shifted significantly toward the side of the longer wavelength, and the absorption wavelength band is shifted from the desired wavelength. Therefore, in order for using the polarization element as that for the G light beam, it is preferable that the protruding sections are arranged in the longitudinal direction of the thin metal wire at a pitch of no smaller than 475 nm and smaller than 545 nm, and the height of each of the protruding sections is set to no lower than 10 nm and no higher than 50 nm.

Further, in the polarization element of the above aspect of the invention, it is also possible that the protruding sections are arranged in the longitudinal direction of the thin metal wire at a pitch of no smaller than 380 nm and smaller than 450 nm, and the height of each of the protruding sections is set to no lower than 10 nm and no higher than 50 nm.

According to this configuration, since the protruding sections are arranged on the thin metal wires at a pitch of no smaller than 380 nm and smaller than 450 nm, and the height of the protruding sections is set to no smaller than 10 nm and no larger than 50 nm, the surface plasmon resonance can be developed with the B light beam. Since the specific linearly polarized light TE (the unwanted polarized light) out of the B light beam entering the polarization element can selectively be absorbed, an application to the polarization element for the B light beam is possible. For example, if the pitch of the protruding sections becomes smaller than 380 nm, the peak of the absorption wavelength is shifted toward the shorter wavelength side, and enters the wavelength band of ultraviolet light. Further, if the pitch of the protruding sections exceeds 450 nm, the peak of the absorption wavelength is shifted toward the longer wavelength side, and enters the wavelength band of the G light beam. On the other hand, if the height of the protruding sections becomes lower than 10 nm, the reflectance is shifted to be increased, and the peak of the decrease in the reflectance becomes gentler, thereby making it harder to absorb the unwanted polarized light. Further, if the height of the protruding sections exceeds 50 nm, the peak of the absorption wavelength is shifted significantly toward the side of the longer wavelength, and the absorption wavelength band is shifted from the desired wavelength. Therefore, in order for using the polarization element as that for the B light beam, it is preferable that the protruding sections are arranged in the longitudinal direction of the thin metal wire at a pitch of no smaller than 380 nm and smaller than 450 nm, and the height of each of the protruding sections is set to no lower than 10 nm and no higher than 50 nm.

Further, in the polarization element of the above aspect of the invention, it is also possible that the protruding sections are arranged in the longitudinal direction of the thin metal wire at a pitch of no smaller than 575 nm and smaller than 675 nm, and the height of each of the protruding sections is set to no lower than 10 nm and no higher than 50 nm.

According to this configuration, since the protruding sections are arranged on the thin metal wires at a pitch of no smaller than 575 nm and smaller than 675 nm, and the height of the protruding sections is set to no smaller than 10 nm and no larger than 50 nm, the surface plasmon resonance can be developed with the R light beam. Since the specific linearly polarized light TE (the unwanted polarized light) out of the R light beam entering the polarization element can selectively be absorbed, an application to the polarization element for the R light beam is possible. For example, if the pitch of the protruding sections becomes smaller than 575 nm, the peak of the absorption wavelength is shifted toward the shorter wavelength side, and enters the wavelength band of the G light beam. Further, if the pitch of the protruding sections exceeds 675 nm, the peak of the absorption wavelength is shifted toward the longer wavelength side, and enters the wavelength band of infrared light. On the other hand, if the height of the protruding sections becomes lower than 10 nm, the reflectance is shifted to be increased, and the peak of the decrease in the reflectance becomes gentler, thereby making it harder to absorb the unwanted polarized light. Further, if the height of the protruding sections exceeds 50 nm, the peak of the absorption wavelength is shifted significantly toward the side of the longer wavelength, and the absorption wavelength band is shifted from the desired wavelength. Therefore, in order for using the polarization element as that for the R light beam, it is preferable that the protruding sections are arranged in the longitudinal direction of the thin metal wire at a pitch of no smaller than 575 nm and smaller than 675 nm, and the height of each of the protruding sections is set to no lower than 10 nm and no higher than 50 nm.

Further, in the polarization element of the above aspect of the invention, it is also possible that a width of each of the protruding sections in the longitudinal direction of the thin metal wire and a distance between two adjacent ones of the protruding sections are respectively the same between the adjacent ones of the thin metal wires.

According to this configuration, it becomes easier for the evanescent wave to be generated compared to the case in which the protruding sections have a random periodicity. Thus, since it becomes easy for the surface plasmon to be excited, the energy of the incident light is consumed, and the reflection toward the entering direction of the light can sufficiently be reduced.

Further, in the polarization element of the above aspect of the invention, it is also possible that shapes of each of the thin metal wires and each of the protruding sections viewed from a direction parallel to a plane of the substrate are each a rectangular shape.

According to this configuration, the thin metal wires and the protruding sections each have a side-view rectangular shape, and are therefore, easy to be manufactured. Specifically, these constituents can easily be manufactured by forming the metal film on the substrate, and then performing anisotropic etching of reactive ion etching (RIE) thereon using the resist pattern as a mask. Therefore, it becomes possible to improve the production efficiency to thereby achieve the cost reduction.

According to yet another aspect of the invention, there is provided a projector including an illumination optical system adapted to emit a light beam, at least one liquid crystal light valve adapted to modulate the light beam, at least one polarization element according to any one of the above aspects of the invention, which the light beam modulated by the liquid crystal light valve enters, and a projection optical system adapted to project a polarized light beam transmitted through the polarization element on a projected surface.

According to this configuration, since the polarization element related to the above aspect of the invention is provided, the deterioration of the polarization element can be prevented even in the case of using a high-power light source. Therefore, there can be provided the projector superior in grayscale expression, capable of realizing high-quality image display, and achieving cost reduction.

Further, in the projector described above, it is also possible that the light beam emitted by the illumination optical system includes a plurality of colored light beams different in wavelength from each other, the liquid crystal light valves are disposed so as to correspond respectively to the colored light beams, and the polarization elements are different from each other in the height of each of the protruding sections corresponding to the colored light beam modulated by the liquid crystal light valve, the protruding sections being included in each of the polarization elements.

According to this configuration, since there are used the polarization elements designed to have the respective heights of each of the protruding sections corresponding to the colored light beams, and therefore different from each other, it is possible to obtain a projector capable of controlling the transmission rate for each of the colored light beams, thereby performing excellent display.

Further, in the projector described above, it is also possible that the light beam emitted by the illumination optical system includes a plurality of colored light beams different in wavelength from each other, the liquid crystal light valves are disposed so as to correspond respectively to the colored light beams, and the polarization elements are different from each other in the pitch of the protruding sections corresponding to the colored light beam modulated by the liquid crystal light valve, the protruding sections being included in each of the polarization elements.

According to this configuration, since there are used the polarization elements designed to have the respective pitches of the protruding sections corresponding to the colored light beams, and therefore different from each other, it is possible to obtain a projector capable of controlling the transmission rate for each of the colored light beams, thereby performing excellent display.

BRIEF DESCRIPTION OF THE DRAWINGS

The invention will be described with reference to the accompanying drawings, wherein like numbers reference like elements.

DESCRIPTION OF AN EXEMPLARY EMBODIMENT

Figure 1:
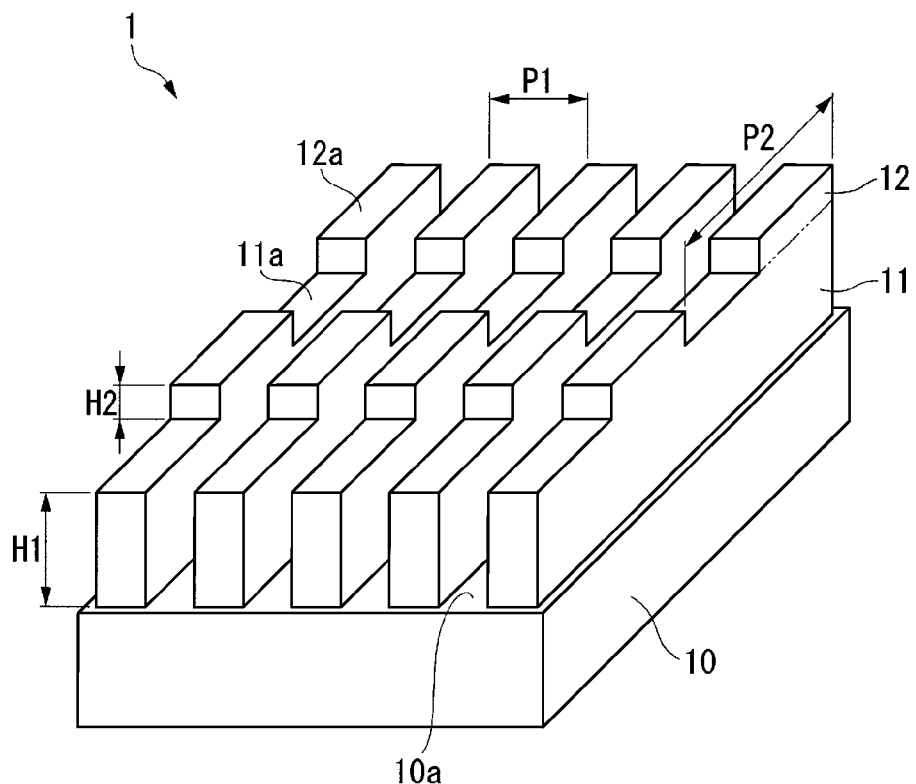
FIG. 1 is a perspective view showing a schematic configuration of a polarization element according to the invention.

Hereinafter, an embodiment of the present invention will be described with reference to the accompanying drawings. The embodiment shows one aspect of the invention, but does not limit the scope of the invention, and can arbitrarily be modified within the scope of the invention. Further, in the drawings explained hereinafter, in order for making each constituent easy to understand, the actual structures and the structures of the drawings are different from each other in scale size, number, and so on.

It should be noted that in the following explanations, an XYZ coordinate system is assumed, and positional relationships between the respective members will be explained with reference to the XYZ coordinate system. In this case, it is assumed that a predetermined direction in a horizontal plane is an X-axis direction, a direction perpendicular to the X-axis direction in the horizontal plane is a Y-axis direction, and a direction perpendicular to both of the X-axis direction and the Y-axis direction is a Z-axis direction.

Polarization Element

FIG. 1 is a perspective view showing a schematic configuration of a polarization element according to the invention. In FIG. 1, the reference symbol P1 denotes the pitch of the thin metal wires, the reference symbol P2 denotes the pitch of sections having a protruding shape (hereinafter referred to as a protruding sections), the reference symbol H1 denotes the height of each of the thin metal wires, and the reference symbol H2 denotes the height of each of the protruding sections. Further, it is assumed that an extending direction of the thin metal wires is the X-axis direction, and the arranging axis of the thin lines is the Y-axis direction.

The polarization element 1 has a structure of absorbing the unwanted polarized light using a surface plasmon resonance (SPR). The polarization element 1 is configured including a substrate 10, the thin metal wires 11, and the protruding sections 12. It should be noted that details of the SPR will be described later.

As the constituent material of the substrate 10, the material having translucency and high heat resistance such as glass or quartz is used. In the present embodiment, glass substrate is used as the substrate 10.

The thin metal wires 11 are formed on the upper surface 10a of the substrate 10 with a predetermined height H1. These thin metal wires 11 are arranged in a direction (the Y-axis direction) parallel to the plane of the substrate 10 at a pitch P1 shorter than the wavelength of the light. Further, the thin metal wires 11 have a dimension in the longitudinal direction (the X-axis direction) sufficiently longer than the wavelength of the light. Further, the thin metal wires 11 each have a rectangular shape (a side-view rectangular shape) viewed from tangential directions (e.g., the X-axis direction and the Y-axis direction) of the upper surface 10a of the substrate 10. Further, the thin metal wires 11 have a striped shape (a plan-view striped shape) viewed from a direction (the Z-axis direction) perpendicular to the plane of the substrate 10.

The thin metal wires 11 are set to have the pitch P1 of about 140 nm, and the height H1 of about 150 nm, for example. Further, the ratio (the ratio between the width of each of the thin metal wires 11 in the Y-axis direction and the distance between the adjacent ones of the thin metal wires 11) between the width of each of the thin metal wires 11 and the width of a space (a groove) therebetween is set to approximately 1 to 1.

It should be noted that the height H1 of the thin metal wires 11 denotes the distance from the upper surface 10a of the substrate 10 to the upper surface 11a of each of the thin metal wires 11. Further, the pitch P1 is obtained by adding the width of each of the thin metal wires 11 in the Y-axis direction and the distance between the adjacent ones of the thin metal wires 11 to each other.

The protruding sections 12 are formed on the upper surface 11a of the thin metal wires 11 with a predetermined height H2. The height H2 of the protruding sections 12 is set to be smaller than the height H1 of the thin metal wires 11 (H2<H1). These protruding sections 12 are arranged in the longitudinal direction (the X-axis direction) of the thin metal wires 11 at a pitch P2 shorter than the wavelength of the light. Further, the protruding sections 12 each have the side-view rectangular shape and the plan-view rectangular shape described above.

Specifically, since the protruding sections 12 are arranged in the longitudinal direction (the X-axis direction) of the thin metal wires 11 at a pitch of no smaller than 300 nm and no larger than 700 nm, it is possible to develop the surface plasmon resonance (SPR) by visible light. Since specific linearly polarized light TE (unwanted polarized light) out of the visible light entering the polarization element can selectively be absorbed, an application to the polarization element for visible light is possible.

The thin metal wires 11 are arranged in a direction (the Y-axis direction) perpendicular to the longitudinal direction of the thin metal wires 11 at a pitch of no smaller than 10 nm and no larger than 200 nm. Thus, the polarization element 1 can develop a superior polarization separation function. On the other hand, if the arrangement pitch of the thin metal wires 11 in the Y-axis direction is set to be smaller than 10 nm, it becomes technically difficult to arrange the thin metal wires 11. Further, if the arrangement pitch of the thin metal wires 11 in the Y-axis direction exceeds 200 nm, the polarization separation performance is degraded, and the polarization element 1 might no longer function as the wire grid polarization element.

The width of each of the protruding sections 12 in the longitudinal direction of the thin metal wires 11 and the distance between two adjacent ones of the protruding sections 12 are respectively the same between the adjacent ones of the thin metal wires 11. Specifically, the protruding sections 12 formed on each of the thin metal wires 11 overlap with each other when viewed from the direction (the Y-axis direction) perpendicular to the longitudinal direction of the thin metal wires 11.

The protruding sections 12 are set to have the pitch P2 of about 500 nm, and the height H2 of about 25 nm, for example. By setting the thin metal wires 11 and the protruding sections 12 to have the pitches P1, P2 and the heights H1, H2 described above, it is possible to provide the structure for developing the SPR.

It should be noted that the height H2 of the protruding sections 12 denotes the distance from the upper surface 11a of each of the thin metal wires 11 to the upper surface 12a of each of the protruding sections 12. Further, the pitch P2 is obtained by adding the width of each of the protruding sections 12 in the X-axis direction and the distance between the adjacent ones of the protruding sections 12 to each other.

As the constituent material of the thin metal wires 11 and the protruding sections 12, aluminum (Al), gold (Au), silver (Ag), copper (Cu), molybdenum (Mo), and chromium (Cr), and alloys of any of these metals, for example, can be used. In the present embodiment, Al is used as the constituent material of both of the thin metal wires 11 and the protruding sections 12.

As described above, by using glass as the constituent material of the substrate 10, and Al as the constituent material of the thin metal wires 11 and the protruding section 12, the heat resistance of the polarization element 1 as a whole can be improved.

Figure 2:
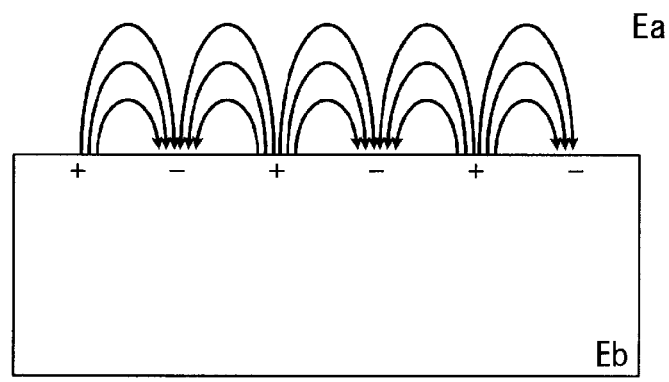
FIG. 2 is a diagram showing a mechanism of the electrical field enhancement by the SPR.

Here, the SPR will be explained with reference to FIG. 2. FIG. 2 is a diagram showing a mechanism of the electrical field enhancement by the SPR. As shown in FIG. 2, the interface between the metal (with a dielectric constant Eb) and the dielectric material (with a dielectric constant Ea) such as air is considered.

Free electrons exist in the metal, and when the light enters the surface of the metal from the side of the dielectric material, a compressional wave (a surface plasmon) of the free electrons can be excited in a certain condition. In this condition, the energy of the light entering the surface of the metal is consumed for the excitation of the surface plasmon. As a result, the energy of the light reflected by the surface of the metal is reduced.

When making the light propagating through air enter a flat metal surface, no surface plasmon can be excited. This is because, in either of the incident angles, the wave number in the interface direction the incident light has becomes smaller than the wave number of the surface plasmon, but is not equal thereto. There is known a method of using a diffraction grating on a metal surface in order for exciting the surface plasmon. This is because, specifically, when making the light enter the diffraction grating, the wave number of the evanescent wave generated is obtained by adding the wave number of the diffraction grating to the wave number of the incident light, and therefore, can be made equal to or larger than the wave number of the surface plasmon. It should be noted that the surface plasmon is a compressional wave of the electrons in the interface direction. Therefore, only the light component with the polarization perpendicular to the diffraction grating can excite the surface plasmon.

Figure 3A:
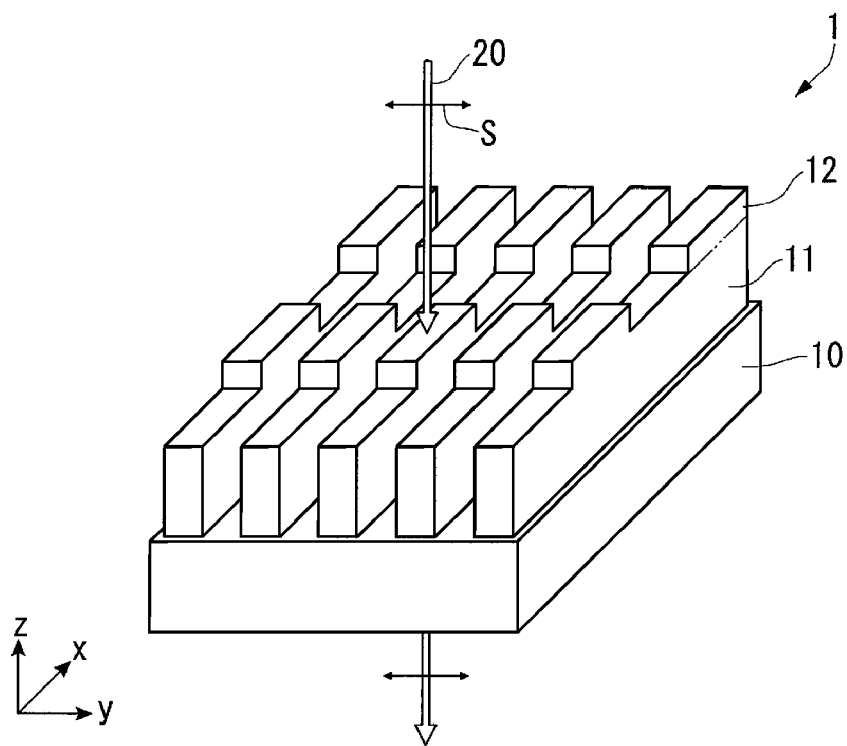
FIGS. 3A and 3B are schematic diagrams showing polarization separation of the incident light to the polarization element.
Figure 3B:
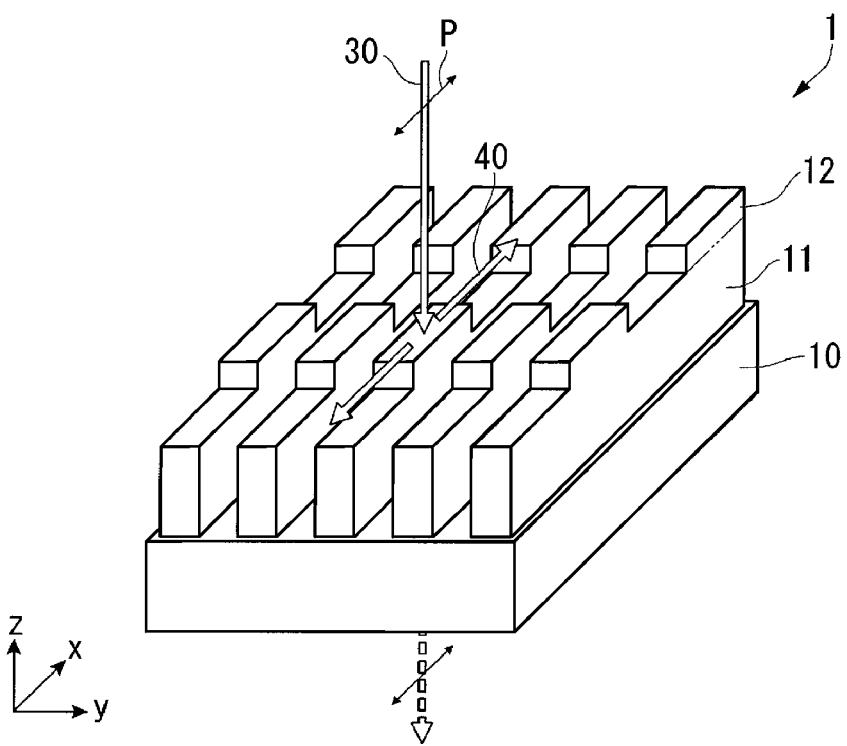
Figure 4A:
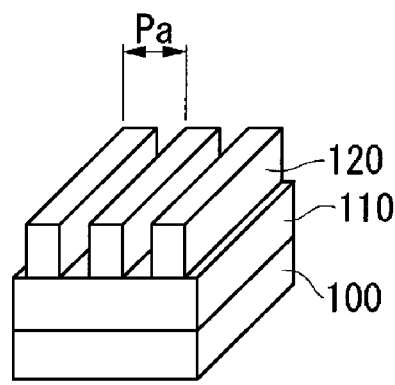
FIGS. 4A through 4E are diagrams showing a manufacturing process of the polarization element.
Figure 4B:
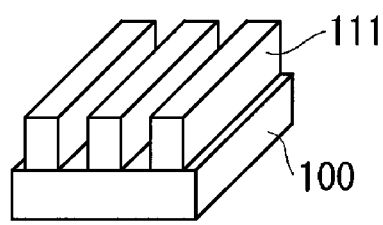
Figure 4C:
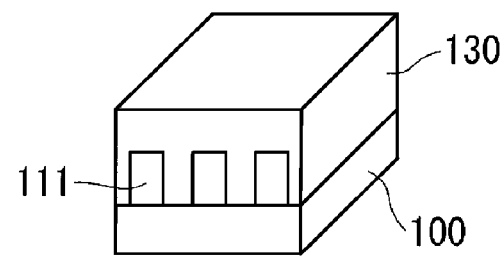
Figure 4D:
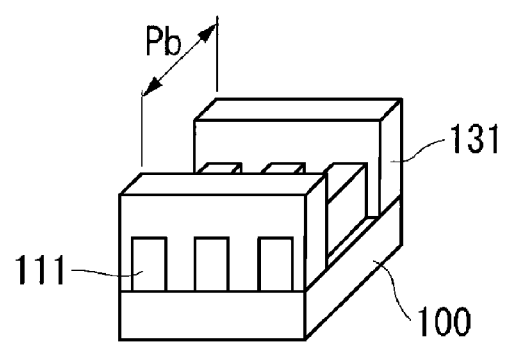
Figure 4E:
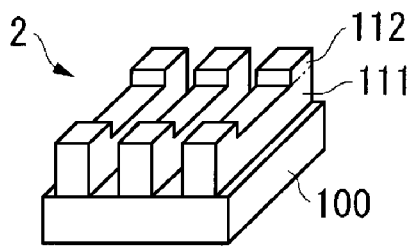

FIGS. 3A and 3B are schematic diagrams showing polarization separation of the incident light to the polarization element 1. FIG. 3A shows the case in which the linearly polarized light TM (transverse magnetic) vibrating in a direction perpendicular to the longitudinal direction of the thin metal wires 11 enters the polarization element 1. FIG. 3B shows the case in which the linearly polarized light TE (transverse electric) vibrating in the longitudinal direction of the thin metal wires 11 enters the polarization element 1.

As shown in FIG. 3A, the incident light 20 to the polarization element 1 has a component "s" (a TM polarized component) having a polarization axis perpendicular to the longitudinal direction (the X-axis direction) of each of the thin metal wires 11. Therefore, the polarization axis s of the incident light 20 becomes parallel to a resonant grating. Specifically, the polarization axis s of the incident light 20 becomes parallel to the direction (the Y-axis direction) in which the protruding sections are aligned between the adjacent ones of the thin metal wires 11. Therefore, according to the principle described above, the evanescent wave is not generated, and no surface plasmon can be excited.

Therefore, in the case in which the linearly polarized light TM enters the polarization element 1, the surface plasmon resonance does not develop. In other words, the polarization element 1 performs only the polarization separation function on the incident light 20. Therefore, as a result, the most part of the incident light 20 is transmitted through the polarization element 1.

As shown in FIG. 3B, the incident light 30 to the polarization element 1 has a component "p" (a TE polarized component) having a polarization axis parallel to the longitudinal direction (the X-axis direction) of each of the thin metal wires 11. Therefore, the polarization axis p of the incident light 30 becomes perpendicular to the resonant grating. Specifically, the polarization axis p of the incident light 30 becomes perpendicular to the direction (the Y-axis direction) in which the protruding sections are aligned between the adjacent ones of the thin metal wires 11. Therefore, according to the principle described above, the surface plasmon 40 can be excited.

Therefore, in the case in which the linearly polarized light TE enters the polarization element 1, the surface plasmon resonance develops. Therefore, the energy of the incident light 30 is consumed for the excitation of the surface plasmon 40. Although under ordinary circumstances the polarization separation function is performed on the incident light 30 having the polarization axis p to reflect the most of the incident light 30, the energy of the incident light 30 is consumed for the excitation of the surface plasmon 40 in the structure according to the invention. Thus, as a result, the reflected light is reduced. In other words, by developing the surface plasmon resonance (SPR), the linearly polarized light TE entering the polarization element 1 can selectively be absorbed.

As described above, according to the invention, there is adopted the configuration in which the thin metal wires 11 are formed on the upper surface of the substrate 10, and the protruding sections 12 are formed on the upper surface 11a of each of the thin metal wires 11 in the longitudinal direction of the thin metal wires 11 at a pitch P2 shorter than the wavelength of the light, thereby developing the SPR. Thus, it becomes possible to selectively absorbing the linearly polarized light TE (unwanted polarized light) without providing the absorbing layer as provided in the case of Document 1.

FIGS. 4A through 4E are diagrams showing a manufacturing process of the polarization element. Firstly, an Al film 110 is formed on the glass substrate 100 by a method such as evaporation or sputtering. Subsequently, photoresist is applied on the Al film 110 by a method such as spin-coating, and a resist pattern 120 is formed (see FIG. 4A) by a method such as two-beam interference exposure. On this occasion, the resist pattern 120 is formed so as to have a pitch Pa (corresponding to the pitch of the thin metal wires) of about 140 nm. It should be noted that the method of forming the resist pattern 120 is not limited thereto. A transfer process such as nanoimprint can also be used.

Subsequently, using the resist pattern 120 as a mask, reactive ion etching (RIE) with a chlorine-based gas is performed. Thus, anisotropic etching is performed on the Al film 110 until the upper surface of the glass substrate 100 is exposed. Subsequently, the resist pattern 120 is removed, thereby forming (see FIG. 4B) the thin metal wires 111.

Subsequently, photoresist 130 is applied (see FIG. 4C) to the surface of the glass substrate 100 provided with the thin metal wires 111 by a method such as spin-coating. Subsequently, a resist pattern 131 with a pitch Pb (corresponding to the pitch of the protruding sections) of about 500 nm is formed (see FIG. 4D) by a method such as two-beam interference exposure. On this occasion, the interference angle of the two-beam interference exposure is varied, and further, the glass substrate 100 is rotated 90 degrees around an axis in a vertical direction of the substrate.

Subsequently, using the resist pattern 131 as a mask, etching (RIE) is performed selectively on the areas with the thin metal wires 111 exposed. Subsequently, the resist pattern 131 is removed, thereby forming (see FIG. 4E) the protruding sections 112. The polarization element 2 according to the present embodiment of the invention can be manufactured by the process described above.

According to the polarization element 1 of the embodiment of the invention, by adopting the resonant grating structure having the protruding sections 12 arranged on the upper surface of the thin metal wires 11 at the pitch P2 shorter than the wavelength of the incident light, it becomes possible to develop the surface plasmon resonance (SPR) to thereby selectively absorb the linearly polarized light TE (unwanted polarized light) with a specific wavelength entering the polarization element 1. Specifically, when the linearly polarized light TE enters the resonant grating structure described above, the evanescent light is generated. The wave number thereof and the wave number of the surface plasmon can be made equal to each other using the evanescent light, and thus the surface plasmon can be excited. Since the energy of the incident light is consumed for the excitation of the surface plasmon, the reflection toward the entering direction of the light can be reduced. Therefore, it becomes possible to provide the polarization element 1 capable of selectively absorbing unwanted polarized light to thereby be superior in grayscale expression, and realize high-quality image display. Further, since it is not required to provide the absorbing layer, which is provided in the case of Document 1, it becomes possible to simplify the element structure to thereby achieve cost reduction.

Further, according to this configuration, since the width of each of the protruding sections 12 in the longitudinal direction of the thin metal wires 11 and the distance between two adjacent ones of the protruding sections 12 are respectively the same between the adjacent ones of the thin metal wires 11, it becomes easier for the evanescent wave to be generated compared to the case in which the protruding sections 12 have a random periodicity. Thus, since it becomes easy for the surface plasmon to be excited, the energy of the incident light is consumed, and the reflection toward the entering direction of the light can sufficiently be reduced.

Further, according to this configuration, the thin metal wires 11 and the protruding sections 12 each have a side-view rectangular shape, and are therefore, easy to be manufactured. Specifically, these constituents can easily be manufactured by forming the metal film on the substrate, and then performing anisotropic etching of the RIE thereon using the resist pattern as a mask. Therefore, it becomes possible to improve the production efficiency to thereby achieve the cost reduction.

According to the polarization element 1 of the present embodiment of the invention, since the protruding sections 12 are arranged in the longitudinal direction (the X-axis direction) of the thin metal wires 11 at the pitch P2 of no smaller than 300 nm and no larger than 700 nm, it is possible to develop the surface plasmon resonance (SPR) by visible light. Since specific linearly polarized light TE (unwanted polarized light) out of the visible light entering the polarization element can selectively be absorbed, an application to the polarization element for visible light is possible. Further, since the thin metal wires 11 are arranged in a direction (the Y-axis direction) perpendicular to the longitudinal direction of the thin metal wires 11 at the pitch P1 of no smaller than 10 nm and no larger than 200 nm, the superior polarization separation function can be developed. For example, if the arrangement pitch P1 of the thin metal wires 11 in the Y-axis direction is set to be smaller than 10 nm, it becomes technically difficult to arrange the thin metal wires 11. Further, if the arrangement pitch P1 of the thin metal wires 11 in the Y-axis direction exceeds 200 nm, the polarization separation performance is degraded, and the polarization element 1 might no longer function as the wire grid polarization element.

It should be noted that although in the present embodiment the structure in which the height H2 of the protruding sections 12 is set to a predetermined height (about 25 nm) is described, the invention is not limited thereto. For example, it is also possible that the height H2 of the protruding sections 12 is set in accordance with the wavelength of the incident light.

According to this configuration, since the optimum value of the height H2 of the protruding sections 12 is different depending on the wavelength of the incident light, by appropriately designing the height to be the same or different, it is possible to obtain the polarization element 1 having a preferable optical characteristic.

Further, although in the present embodiment the structure in which the ratio between the width of each of the thin metal wires 11 and the width of the space (the groove) thereof is set to approximately 1 to 1 is described, the invention is not limited thereto. For example, the ratio between the width of each of the thin metal wires 11 and the space (the groove) thereof can also be set differently.

Further, although in the present embodiment the example of arranging the protruding sections 12 on the upper surface 11a of each of the thin metal wires 11 is shown, the invention is not limited thereto. For example, the protruding sections 12 can also be arranged on at least one surface of each of the thin metal wires 11 such as a side surface of each of the thin metal wires 11. Even in such a configuration, the surface plasmon can be excited.

Projector

Figure 5:
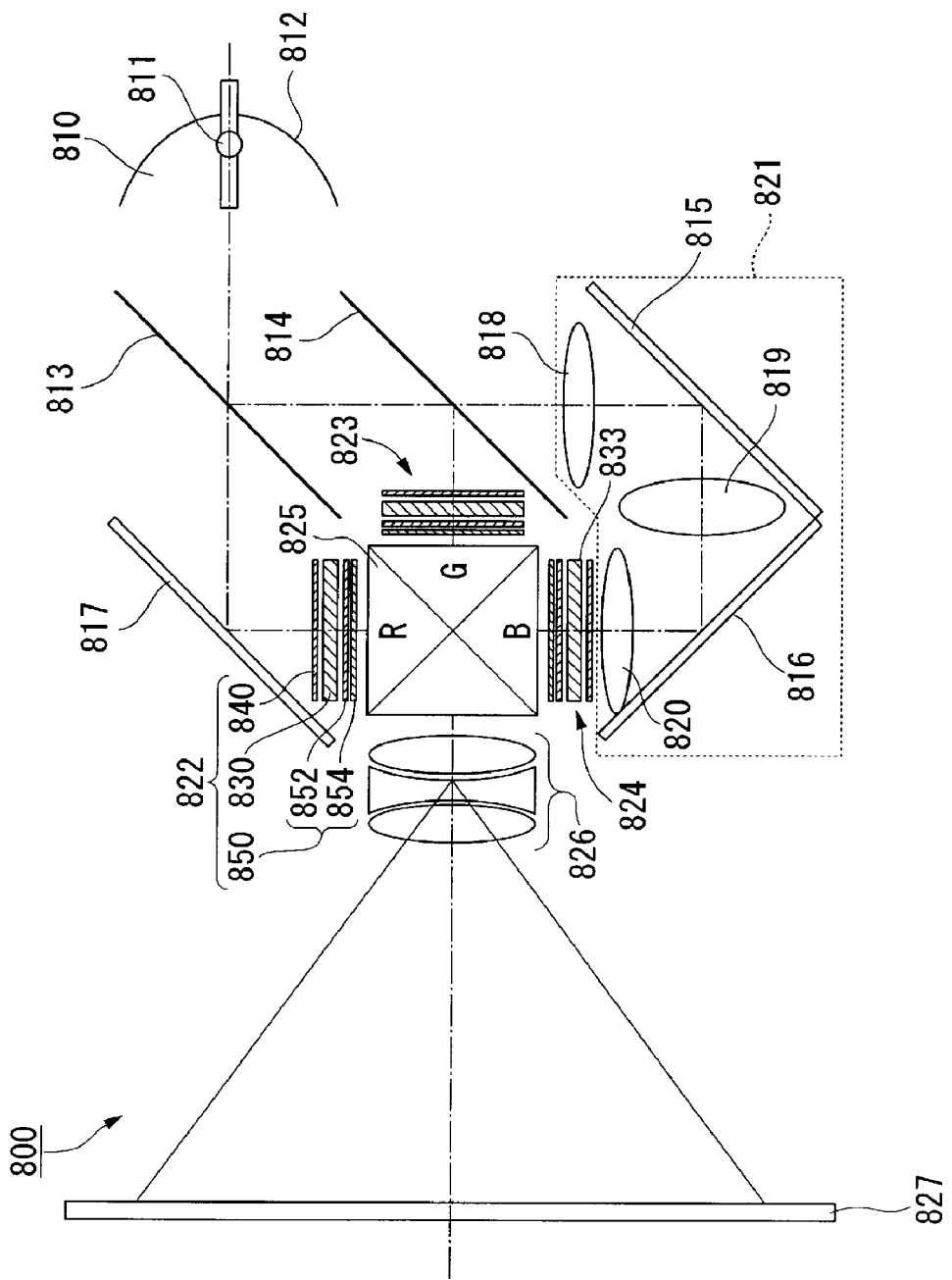
FIG. 5 is a schematic diagram showing an example of a projector.

FIG. 5 is a schematic diagram showing an example of a projector equipped with the polarization element according to the present embodiment of the invention.

As shown in FIG. 5, a projector 800 has a light source 810, dichroic mirrors 813, 814, reflecting mirrors 815, 816, 817, an entrance lens 818, a relay lens 819, an exit lens 820, light modulation sections 822, 823, 824, a cross dichroic prism 825, and a projection lens 826.

The light source 810 is composed of a lamp 811 such as a metal halide lamp, and a reflector 812 for reflecting the light of the lamp. It should be noted that as the light source 810, a super-high pressure mercury lamp, a flash mercury lamp, a high-pressure mercury lamp, a deep UV lamp, a xenon lamp, a xenon flash lamp, and so on can also be used besides the metal halide lamp.

The dichroic mirror 813 transmits red light included in white light emitted form the light source 810, and reflects blue light and green light. The red light thus transmitted is reflected by the reflecting mirror 817, and input to the light modulation section 822 for the red light. Further, the green light out of the blue light and the green light both reflected by the dichroic mirror 813 is reflected by the dichroic mirror 814, and is input to the light modulation section 823 for the green light. The blue light is transmitted through the dichroic mirror 814, and is input to the light modulation section 824 for the blue light via the relay optical system 821 provided for preventing the light loss due to a long light path, and including the entrance lens 818, the relay lens 819, and exit lens 820.

The light modulating sections 822 through 824 each have an entrance side polarization element 840 and an exit side polarization element section 850 disposed on the both sides of a liquid crystal light valve 830 so as to sandwich the liquid crystal light valve 830. The entrance side polarization element 840 and the exit side polarization element section 850 are arranged so as to have the respective transmission axes perpendicular to each other (the cross-Nicol arrangement).

The entrance side polarization element 840 is a reflective type polarization element, and reflects the light having the oscillation direction perpendicular to the transmission axis.

On the other hand, the exit side polarization element section 850 has a first polarization element (a pre-polarization plate, a pre-polarizer) 852, and a second polarization element 854. As the first polarization element 852, there is used the polarization element according to the present embodiment of the invention described above, having high heat resistance. Further, the second polarization element 854 is a polarization element having an organic material as the constituent material. Both of the polarization elements used in the exit side polarization element section 850 are the absorbing type polarization elements, and the polarization elements 852, 854 absorb the light in cooperation with each other.

In general, the absorbing type polarization element formed of an organic material is easily deteriorated by heat, and therefore, hard to be used as a polarization section of a high-power projector requiring high luminance. However, in the projector 800 of the embodiment of the invention, the first polarization element 852 formed of an inorganic material having high heat resistance is disposed between the second polarization element 854 and the liquid crystal light valve 830, and the polarization elements 852, 854 absorb the light in cooperation with each other. Therefore, the deterioration of the second polarization element 854 formed of an organic material can be prevented.

Further, in order for efficiently transmitting the light beams to be modulated by the respective light modulation sections 822 through 824, the first polarization elements 852 have the heights of the protruding sections on the upper surface of the thin metal wires provided to the respective first polarization elements 852 different from each other so as to correspond to the wavelengths of the light beams to be modulated by the respective light modulation sections 822 through 824. Therefore, it is arranged that the light beams can efficiently be used.

The three colored light beams modulated by the respective light modulation sections 822 through 824 are input to the cross dichroic prism 825. The cross dichroic prism 825 is composed of four rectangular prisms bonded to each other, and on the interface therebetween, there are formed a dielectric multilayer film for reflecting the red light and a dielectric multilayer film for reflecting the blue light to have an X shape. The three colored light beams are combined by these dielectric multilayer films to form a light beam for representing a color image. The light beam obtained by combining the three colored light beams is projected on a screen 827 by the projection lens 826 as a projection optical system, thus the image is displayed in an enlarged manner.

Since the projector 800 having such a configuration as described above is arranged to use the polarization element according to the embodiment of the invention described above as the exit side polarization element section 850, even if the high power light source is used, deterioration of the polarization element can be prevented. Therefore, there can be provided the projector 800 superior in grayscale expression, capable of realizing high-quality image display, and achieving cost reduction.

SPECIFIC EXAMPLES

The inventors have performed an evaluation by a simulation analysis in order for confirming the effectiveness of the polarization element according to the embodiment of the invention. The simulation analysis has been performed using an electromagnetic field analysis by a finite difference time domain (FDTD) method.

As the specific example, the polarization element (see FIG. 1) according to the present embodiment of the invention is used, and as a comparative example, a structure (what is obtained by eliminating the protruding sections from the polarization element shown in FIG. 1) with no resonant grating formed is used. The optical characteristics in which the specific example and the comparative example are compared are alight transmission rate (Tp) with respect to the TM light, a light transmission rate (Tc) with respect to the TE light, a reflectance (Rp) with respect to the TM light, and a reflectance (Rc) with respect to the TE light.

Figure 6A:
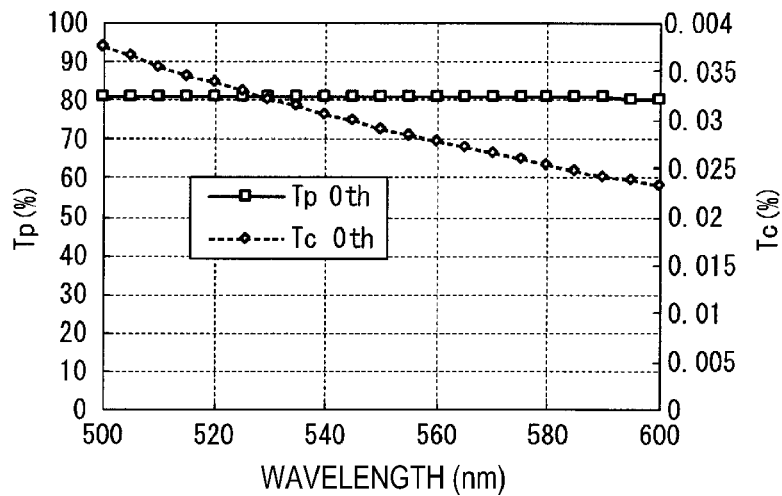
FIGS. 6A through 6C are graphs showing a comparison result of transmission characteristics by an FDTD method.
Figure 6B:
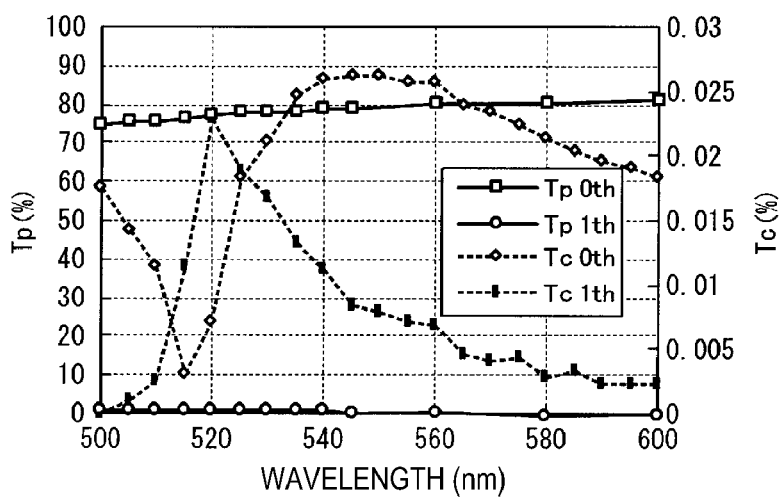
Figure 6C:
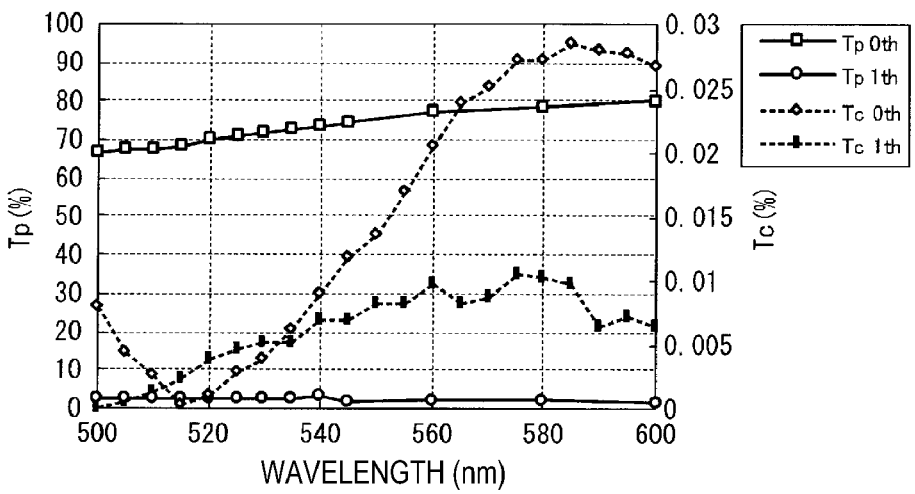

FIGS. 6A through 6C, and 7A through 7C are graphs showing an evaluation result. FIGS. 6A through 6C show the comparison result of the transmission characteristics, specifically the comparison results of the light transmission rate (Tp) with respect to the TM light, and the light transmission rate (Tc) with respect to the TE light. Further, FIG. 6A shows the result of the comparative example, FIG. 6B shows the result of the specific example in which the depth (the height of the protruding sections) of the resonant grating is set to 25 nm, and FIG. 6C shows the result of the specific example in which the depth (the height of the protruding sections) of the resonant grating is set to 50 nm.

Figure 7A:
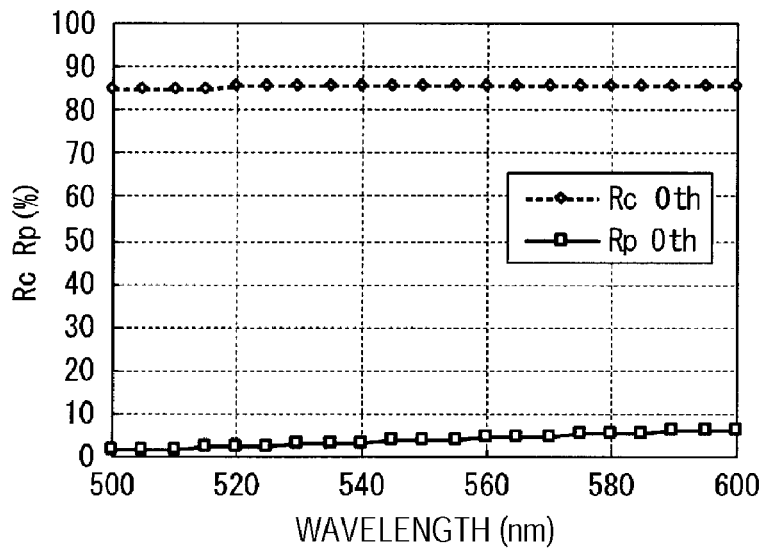
FIGS. 7A through 7C are graphs showing a comparison result of reflection characteristics by the FDTD method.
Figure 7B:
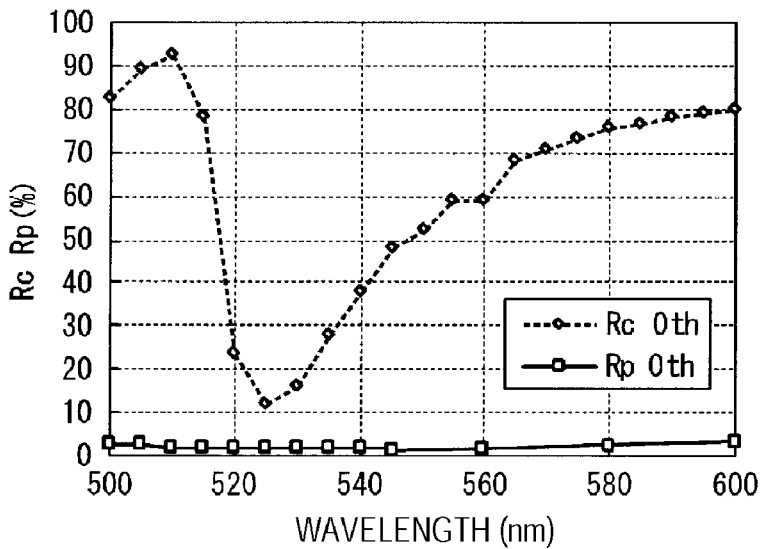
Figure 7C:
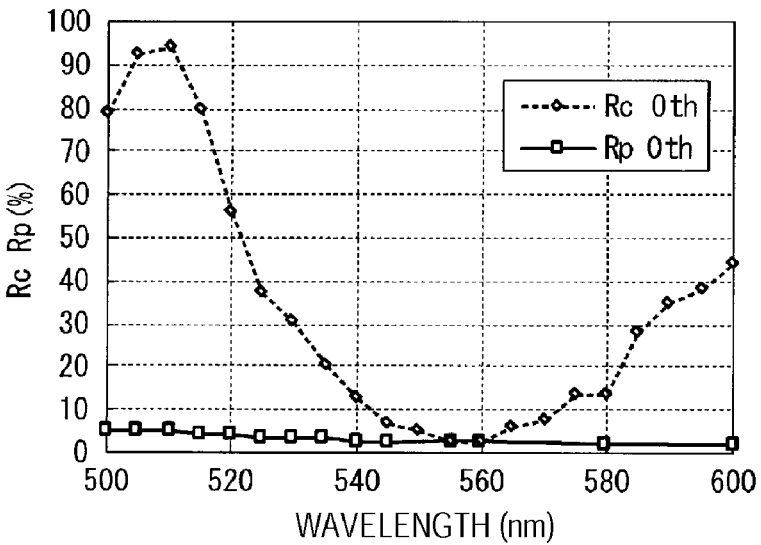

FIGS. 7A through 7C show the comparison result of the reflection characteristics, specifically the comparison results of the reflectance (Rp) with respect to the TM light, and the reflectance (Rc) with respect to the TE light. Further, FIG. 7A shows the result of the comparative example, FIG. 7B shows the result of the specific example in which the depth (the height of the protruding sections) of the resonant grating is set to 25 nm, and FIG. 7C shows the result of the specific example in which the depth (the height of the protruding sections) of the resonant grating is set to 50 nm.

In FIGS. 6A through 6C, the lateral axis represents the wavelength of the incident light, a vertical axis (left side) represents the light transmission rate (Tp) with respect to the TM light, and a vertical axis (right side) represents the light transmission rate (Tc) with respect to the TE light.

In FIGS. 7A through 7C, the lateral axis represents the wavelength of the incident light, the vertical axes respectively represent the reflectance (Rp) with respect to the TM light, and the reflectance (Rc) with respect to the TE light.

In FIGS. 6A through 6C, and 7A through 7C, "0th" denotes a zero-order light component (the case in which the optical path difference between before and after the light enters the polarization element is 0) of the incident light, and "1th"

denotes a first-order light component (the case in which the optical path difference between before and after the light enters the polarization element is a half wavelength) of the incident light.

In the transmission characteristics of the comparative example, although wavelength dependency can be recognized in Tc, a change in Tp can hardly be recognized. Further, Tp is kept at about 80% while Tc is kept in a range lower than 0.04%, which shows that the polarization separation occurs (see FIG. 6A).

In the transmission characteristics of the specific example, occurrence of the first-order light component is confirmed in both of Tp and Tc. Since the first-order light component has an extremely low light transmission rate, it is conceivable that the first-order light component does not have influence on the optical characteristics of the polarization element. Further, similarly to the transmission characteristics (see FIG. 6A) of the comparative example, in the zero-order light component of Tp a change can hardly be recognized in this band. In contrast, a significant change can be recognized in Tc (see FIGS. 6B and 6C).

In the reflection characteristics of the comparative example, both of Rp and Rc show approximately constant values in this band. Further, Rc is kept at about 85% while Rp is kept in a range lower than 10%, which shows that the TE light is reflected selectively (see FIG. 7A). Thus, it is confirmed that the typical reflective polarization element can be modeled, and the calculation result can be obtained.

In the reflection characteristics of the specific example in which the depth of the resonant grating is set to 25 nm, a large decrease in the reflectance can be recognized around the wavelength of 525 nm in Rc (see FIG. 7B). It is conceivable that this decrease in the reflectance is caused by the consumption of the energy of the incident light for the excitation of the surface plasmon.

In contrast, in the reflection characteristics of the specific example in which the depth of the resonant grating is set to 50 nm, a large decrease in the reflectance can be recognized around the wavelength of 560 nm in Rc (see FIG. 7C). It is conceivable that this decrease in the reflectance is also caused by the consumption of the energy of the incident light for the excitation of the surface plasmon. Further, it is understood that the resonant wavelength is shifted toward the side of the longer wavelength by increasing the depth of the resonant grating. Thus, it is conceivable that the resonant frequency varies in accordance with the depth of the resonant grating.

When comparing the reflection characteristics (around the peak frequency 525 nm of the decrease in the reflectance) when setting the depth of the resonant grating to 25 nm and the reflection characteristics (around the peak frequency 560 nm of the decrease in the reflectance) when setting the depth of the resonant grating to 50 nm with each other, it is understood that when decreasing the depth of the resonant grating by 25 nm, the peak of the decrease in the reflectance decreases by approximately 10% (the reflectance increases by approximately 10%). Thus, it is presumable that if the height of the protruding sections is lower than 10 nm, the reflectance is shifted so as to increase, and the peak of the decrease in the reflectance becomes gentler. In other words, if the height H2 of the protruding sections is lower than 10 nm, the peak of the decrease in the reflectance becomes gentler, and it becomes harder to absorb the unwanted polarized light. Further, if the height H2 of the protruding sections exceeds 50 nm, the peak of the absorption wavelength is shifted toward the side of the longer wavelength.

Figure 8A:
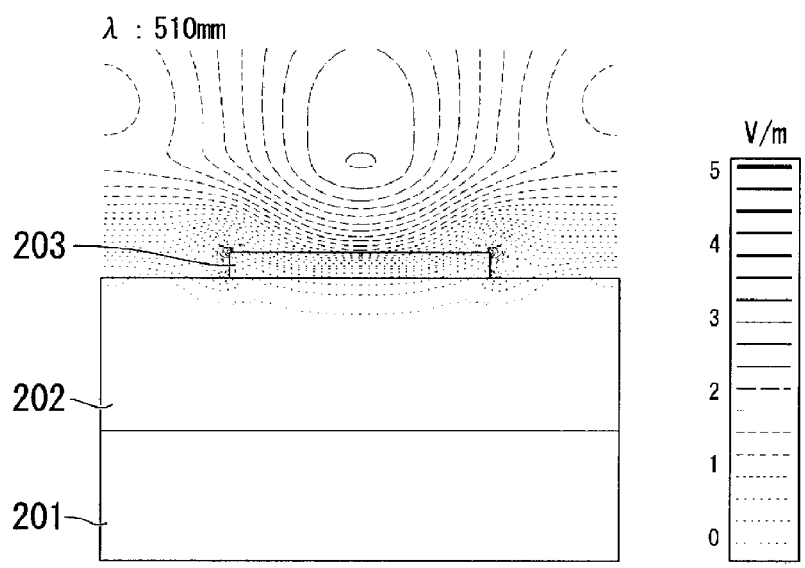
FIGS. 8A through 8C are diagrams showing electric field intensity distribution at predetermined wavelengths.
Figure 8B:
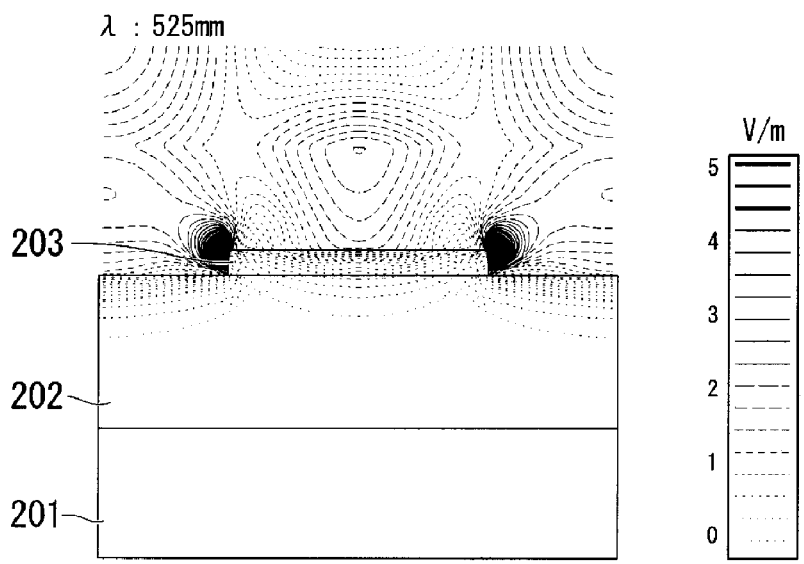
Figure 8C:
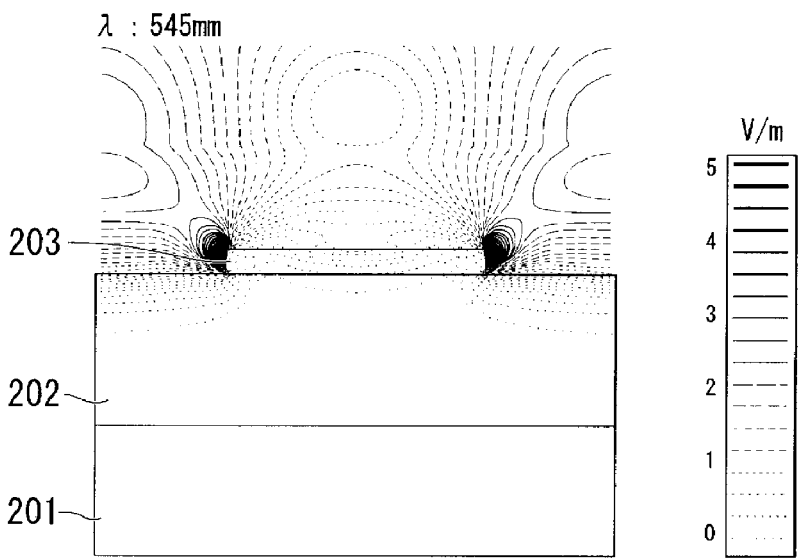

FIGS. 8A through 8C are diagrams showing electromagnetic field intensity distribution at respective wavelengths of 510 nm, 525 nm, and 545 nm in the polarization element with the depth of the resonant grating of 25 nm. Further, FIG. 8A shows the case with the wavelength of 510 nm, FIG. 8B shows the case with the wavelength of 525 nm, and FIG. 8C shows the case with the wavelength of 545 nm. It should be noted that FIGS. 8A through 8C each show the distribution in the X-Z plane passing through the center of the protruding section in the polarization element shown in FIG. 1. Further, in FIGS. 8A through 8C, the reference numeral 201 denotes the glass substrate, the reference numeral 202 denotes the thin metal wire (Al), and the reference numeral 203 denotes the protruding section.

As shown in FIGS. 8A through 8C, it is understood that a strong electric field is localized in the vicinity of the protruding section 203 in the case with the wavelength of 525 nm compared to the cases with the wavelengths of 510 nm and 545 nm. According to this result, it is conceivable that the rapid decrease in Rc around the wavelength of 525 nm shown in the reflection characteristics (see FIG. 7B) of the specific example is caused by the excitation of the surface plasmon. Further, when comparing the case with the wavelength of 510 nm and the case with the wavelength of 545 nm with each other, a strong electric field is localized in the vicinity of the protruding section 203 in the case with the wavelength of 545 nm, and this result also matches the relationship (see FIGS. 7B and 7C) of the reflection characteristics of the specific example.

As described above, it is understood that according to the polarization element related to the present embodiment of the invention, Rc decreases dramatically around the wavelength of 525 nm. Since Tp keeps the high transmission rate in the wavelength of 525 nm, it is understood that there is realized the polarization element of an absorption type with respect to the light having a specific wavelength.

Then, the resonance wavelength at which the surface plasmon is excited will be considered. In the reflection characteristics (see FIG. 7B) of the specific example, it is presumable that the strongest resonance occurs at the wavelength of 525 nm, and the surface plasmon is excited. The resonant wavelength can be estimated as follows.

The wave number "kx" of the surface plasmon can be obtained by the following formula.

$$kx = \frac{w^2}{C^2} \sqrt{\frac{Ea \cdot Eb}{Ea + Eb}} \qquad (1)$$

In Formula 1, "w" denotes the angular frequency of the surface plasmon, "C" denotes the light speed, "Ea" denotes a dielectric constant of the dielectric material, and "Eb" denotes a dielectric constant of the metal. It should be noted that since the dielectric constant has a wavelength dependency, no linear relationship is obtained between "w" and "kx."

Figure 9:
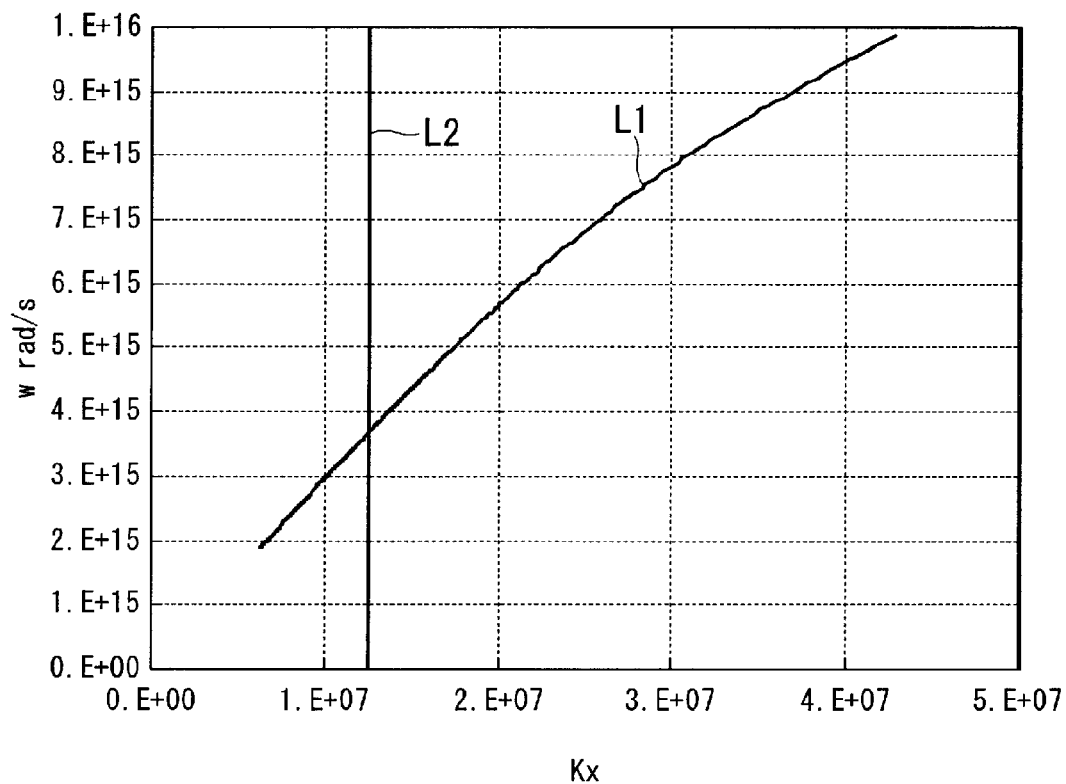
FIG. 9 is a diagram showing a relationship between the wave number of a surface plasmon and the angular frequency of the surface plasmon.

The curve denoted by the reference symbol L1 in FIG. 9 is a dispersion curve of the surface plasmon generated in the interface between the Al plane and air.

The wave number in the X-axis direction the resonant grating has is expressed as 2 πm/P (here, "P" denotes the pitch of the grating, and "m" is an integer). Considering the normal incidence, no wave number in the X-axis direction exists in the incident light. However, by entering the grating with pitch P, the mth-order evanescent light can obtain the wave number of 2 πm/P. The straight line L2 corresponds to the wave number assuming P=500 nm. At the point where the dispersion curve L1 of the surface plasmon and the wave number line L2 of the evanescent wave intersect with each other, the wave number of the surface plasmon and the wave number of the incident light match with each other. Thus, the resonance conditions are satisfied, and it becomes possible to excite the surface plasmon. In FIGS. 3A and 3B, the wavelength calculated based on "w" of the intersection point becomes 512 nm. Therefore, the surface plasmon is excited by the light with the wavelength of 512 nm.

Although Formula 1 expresses the wave number of the surface plasmon formed on the flat substrate surface, since the grating exists in reality, it is conceivable that an error is caused in the effective dielectric constant. Specifically, it is conceivable that the resonant wavelength (525 nm) obtained from the reflection characteristics of the specific example is resulted by shifting the estimated wavelength (512 nm). Therefore, when estimating the pitch of the resonant grating, such estimations are effective.

Figure 10:
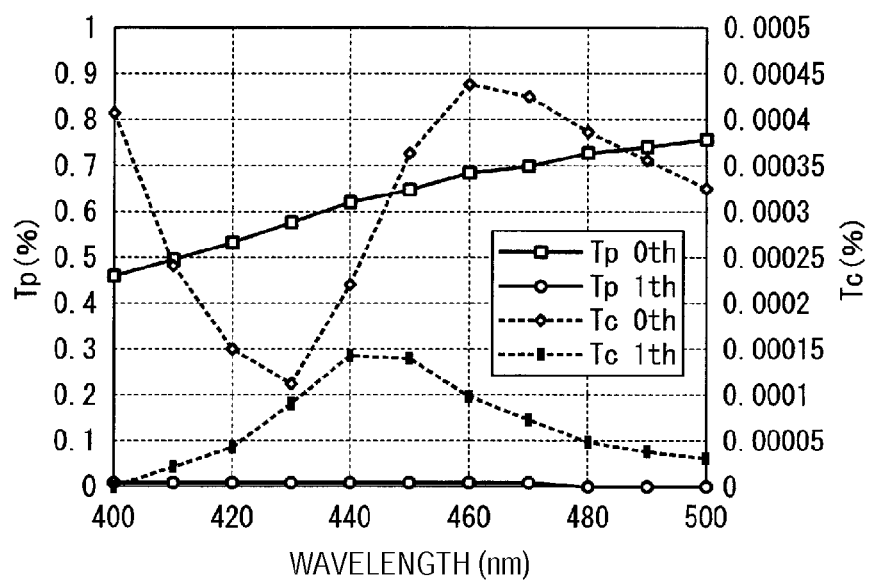
FIG. 10 is a graph showing a comparison result of transmission characteristics by the FDTD method.
Figure 11:
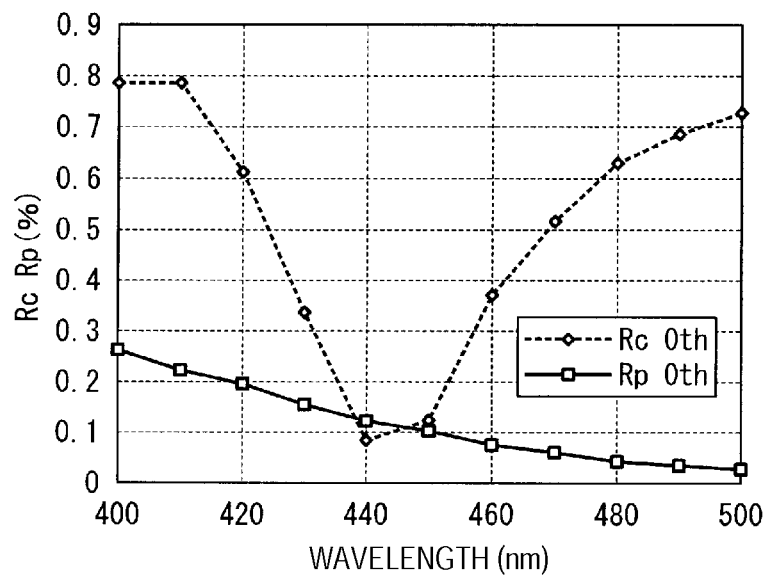
FIG. 11 is a graph showing a comparison result of reflection characteristics by the FDTD method.
Figure 12:
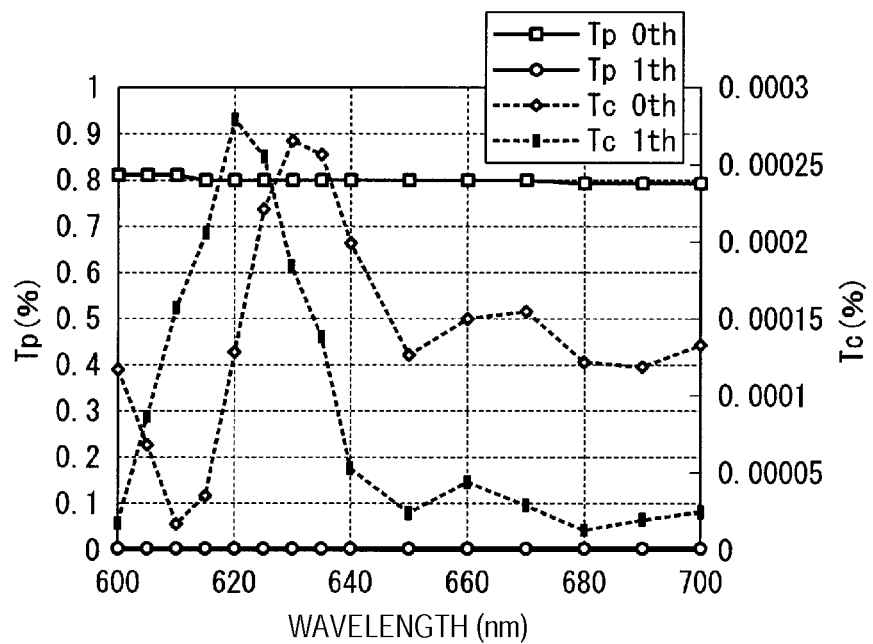
FIG. 12 is a graph showing a comparison result of transmission characteristics by an FDTD method.

FIGS. 10 through 13 are graphs showing an evaluation result in the cases of changing the pitch P2 of the protruding sections, wherein FIGS. 10 and 12 correspond to FIGS. 6A through 6C, and FIGS. 11 and 13 correspond to FIGS. 7A through 7C.

FIG. 10 shows the result of the transmission characteristics in the case in which the pitch P2 of the protruding sections is set to 400 nm and the depth (the height of the protruding sections) of the resonant grating is set to 25 nm in the specific example. Specifically, FIG. 10 shows the result of the light transmission rate (Tp) with respect to the TM light, and the light transmission rate (Tc) with respect to the TE light.

FIG. 11 shows the result of the reflection characteristics in the case in which the pitch P2 of the protruding sections is set to 400 nm and the depth (the height of the protruding sections) of the resonant grating is set to 25 nm in the specific example. Specifically, FIG. 11 shows the comparison result of the reflectance (Rp) with respect to the TM light, and the reflectance (Rc) with respect to the TE light.

FIG. 12 shows the result of the transmission characteristics in the case in which the pitch P2 of the protruding sections is set to 600 nm, and the depth (the height of the protruding sections) of the resonant grating is set to 25 nm in the specific example. Specifically, FIG. 12 shows the comparison result of the light transmission rate (Tp) with respect to the TM light, and the light transmission rate (Tc) with respect to the TE light.

Figure 13:
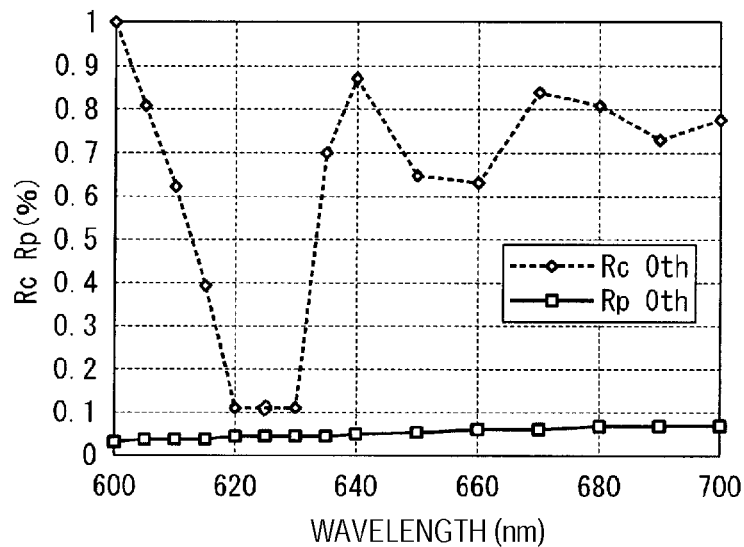
FIG. 13 is a graph showing a comparison result of reflection characteristics by the FDTD method.

FIG. 13 shows the result of the reflection characteristics in the case in which the pitch P2 of the protruding sections is set to 600 nm, and the depth (the height of the protruding sections) of the resonant grating is set to 25 nm in the specific example. Specifically, FIG. 13 shows the comparison result of the reflectance (Rp) with respect to the TM light, and the reflectance (Rc) with respect to the TE light.

In FIG. 10, the lateral axis represents the wavelength of the incident light, a vertical axis (left side) represents the light transmission rate (Tp) with respect to the TM light, and a vertical axis (right side) represents the light transmission rate (Tc) with respect to the TE light.

In FIG. 11, the lateral axis represents the wavelength of the incident light, the vertical axes respectively represent the reflectance (Rp) with respect to the TM light, and the reflectance (Rc) with respect to the TE light.

In FIG. 12, the lateral axis represents the wavelength of the incident light, a vertical axis (left side) represents the light transmission rate (Tp) with respect to the TM light, and a vertical axis (right side) represents the light transmission rate (Tc) with respect to the TE light.

In FIG. 13, the lateral axis represents the wavelength of the incident light, the vertical axes respectively represent the reflectance (Rp) with respect to the TM light, and the reflectance (Rc) with respect to the TE light.

In FIGS. 10 through 13, "0th" denotes a zero-order light component (the case in which the optical path difference between before and after the light enters the polarization element is 0) of the incident light, and "1th" denotes a first-order light component (the case in which the optical path difference between before and after the light enters the polarization element is a half wavelength) of the incident light.

In the transmission characteristics of the specific example (the pitch P2=400 nm), occurrence of the first-order light component is confirmed in both of Tp, Tc. Since the first-order light component has an extremely low light transmission rate, it is conceivable that the first-order light component does not have influence on the optical characteristics of the polarization element. Further, a gentle change in the zero-order light component of Tp can be recognized in this band. In contrast, a significant change can be recognized in Tc (see FIG. 10).

In the reflection characteristics of the specific example (the pitch P2=400 nm), a significant decrease in the reflectance can be recognized around the wavelength of 440 nm in Rc (see FIG. 11). It is conceivable that this decrease in the reflectance is caused by the consumption of the energy of the incident light for the excitation of the surface plasmon.

In the transmission characteristics of the specific example (the pitch P2=600 nm), occurrence of the first-order light component is confirmed in both of Tp, Tc. Since the first-order light component has an extremely low light transmission rate, it is conceivable that the first-order light component does not have influence on the optical characteristics of the polarization element. Further, similarly to the transmission characteristics (see FIG. 6A) of the comparative example, in the zero-order light component of Tp a change can hardly be recognized in this band. In contrast, a significant change can be recognized in Tc (see FIG. 12).

In the reflection characteristics of the specific example (the pitch P2=600 nm), a significant decrease in the reflectance can be recognized around the wavelength of 625 nm in Rc (see FIG. 13). It is conceivable that this decrease in the reflectance is caused by the consumption of the energy of the incident light for the excitation of the surface plasmon.

According to the results described above, when looking at the peak of the decrease in the reflectance in the case of keeping the depth (the height H2 of the protruding sections) of the resonant grating at a constant value of 25 nm, and changing the wavelength (the pitch P2 of the protruding sections) of the incident light, the peak of the decrease in the reflectance in the case of setting the pitch P2 of the protruding sections to 400 nm is in the vicinity of the wavelength of 440 nm (see FIG. 11), the peak of the decrease in the reflectance in the case of setting the pitch P2 of the protruding sections to 500 nm is in the vicinity of the wavelength of 525 nm (see FIG. 7B), and the peak of the decrease in the reflectance in the reflection characteristics in the case of setting the pitch P2 of the protruding sections to 600 nm is in the vicinity of the wavelength of 625 nm (see FIG. 13). In other words, it is understood that resonant frequency shifts toward the longer wavelength side by increasing the pitch P2 of the protruding sections. Thus, it is conceivable that the resonant frequency varies in accordance with the pitch P2 of the protruding sections.

Figure 14:
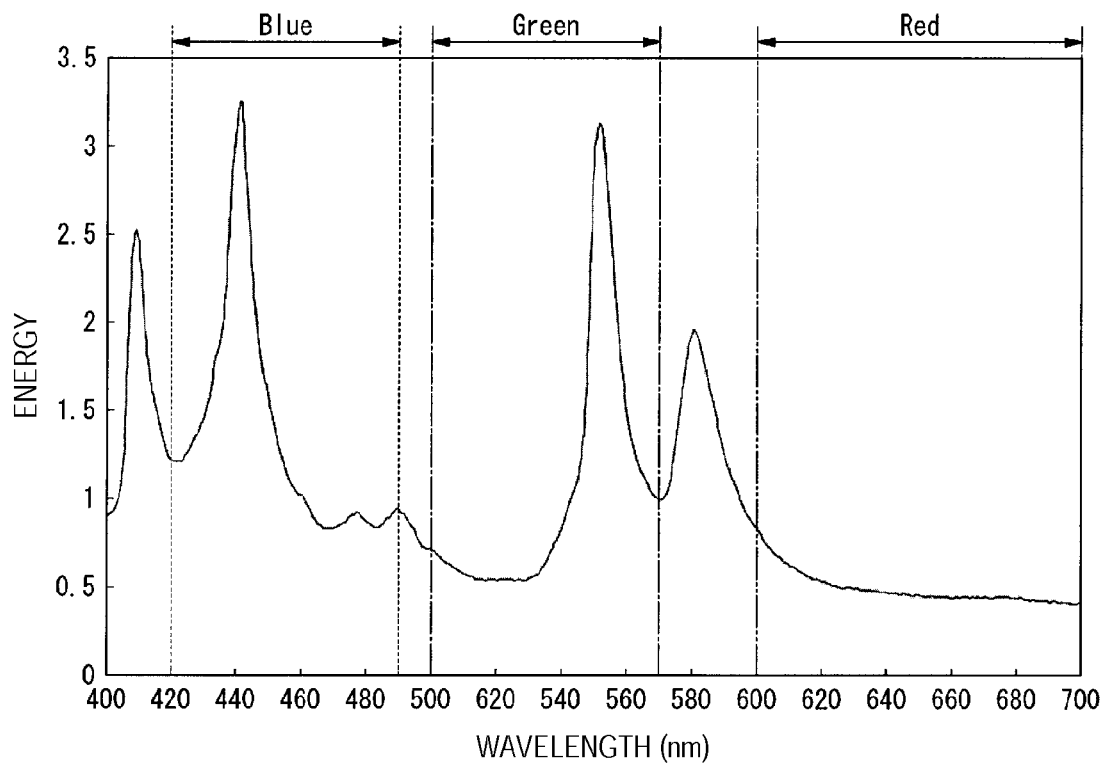
FIG. 14 is a diagram showing the spectrum of a projector light source.

FIG. 14 is a diagram showing the spectrum of a projector light source. In FIG. 14, the lateral axis represents the wavelength of the light beam and the vertical axis represents the intensity (energy) of the light beam.

According to FIG. 14, it can be assumed that the wavelength band of G light beam is 500 through 570 nm, the wavelength band of B light beam is 420 through 490 nm, and the wavelength band of R light beam is 600 through 700 nm.

On the other hand, according to FIGS. 7A through 7C, when looking at the relationship between the pitch P2 (500 nm) of the protruding sections and the peak wavelength (525 nm) of the decrease in the reflectance in the reflection characteristics of the specific example (the pitch P2=500 nm), it is understood that the following expression is satisfied.

(peak wavelength) [nm]=(pitch (P2) of protruding sections) +25

According to FIG. 11, when looking at the relationship between the pitch P2 (400 nm) of the protruding sections and the peak wavelength (440 nm) of the decrease in the reflectance in the reflection characteristics of the specific example (the pitch P2=400 nm), it is understood that the following expression is satisfied.

(peak wavelength) [nm]=(pitch (P2) of protruding sections) +40

According to FIG. 13, when looking at the relationship between the pitch P2 (600 nm) of the protruding sections and the peak wavelength (625 nm) of the decrease in the reflectance in the reflection characteristics of the specific example (the pitch P2=600 nm), it is understood that the following expression is satisfied.

(peak wavelength) [nm]=(pitch (P2) of protruding sections) +25

According to the above points, it is understood that there is a certain relationship between the pitch P2 of the protruding sections corresponding to the light beam of each color and the peak wavelength of the decrease in the reflectance in the wavelength band of the corresponding color. Specifically, the pitch P2 of the protruding sections corresponding to the light beam of each color can be obtained by subtracting the difference between the peak wavelength and the pitch P2 of the protruding sections at the pitch P2 corresponding to the light beam of that color from the wavelength band of the light beam of that color.

Therefore, the pitch P2 of the protruding sections corresponding to the G light beam is in the range of (500-25) through (570-25), namely no smaller than 475 nm and smaller than 545 nm.

The pitch P2 of the protruding sections corresponding to the B light beam becomes in the range of (420-40) through (490-40), namely no smaller than 380 nm and smaller than 450 nm.

The pitch P2 of the protruding sections corresponding to the R light beam becomes in the range of (600-25) through (700-25), namely no smaller than 575 nm and smaller than 675 nm.

Therefore, by setting the pitch P2 of the protruding sections to no smaller than 475 nm and smaller than 545 nm, and the height H2 of the protruding sections to no smaller than 10 nm and no larger than 50 nm, the surface plasmon resonance can be developed with the G light beam. Since the specific linearly polarized light TE (the unwanted polarized light) out of the G light beam entering the polarization element can selectively be absorbed, an application to the polarization element for the G light beam is possible. For example, if the pitch P2 of the protruding sections becomes smaller than 475 nm, the peak of the absorption wavelength is shifted toward the shorter wavelength side, and enters the wavelength band of the B light beam. Further, if the pitch P2 of the protruding sections exceeds 545 nm, the peak of the absorption wavelength is shifted toward the longer wavelength side, and enters the wavelength band of the R light beam. On the other hand, if the height H2 of the protruding sections becomes lower than 10 nm, the reflectance is shifted to be increased, and the peak of the decrease in the reflectance becomes gentler, thereby making it harder to absorb the unwanted polarized light. Further, if the height H2 of the protruding sections exceeds 50 nm, the peak of the absorption wavelength is shifted significantly toward the side of the longer wavelength, and the absorption wavelength band is shifted from the desired wavelength.

Further, by setting the pitch P2 of the protruding sections to no smaller than 380 nm and smaller than 450 nm, and the height H2 of the protruding sections to no smaller than 10 nm and no larger than 50 nm, the surface plasmon resonance can be developed with the B light beam. Since the specific linearly polarized light TE (the unwanted polarized light) out of the B light beam entering the polarization element can selectively be absorbed, an application to the polarization element for the B light beam is possible. For example, if the pitch P2 of the protruding sections becomes smaller than 380 nm, the peak of the absorption wavelength is shifted toward the shorter wavelength side, and enters the wavelength band of ultraviolet light. Further, if the pitch P2 of the protruding sections exceeds 450 nm, the peak of the absorption wavelength is shifted toward the longer wavelength side, and enters the wavelength band of the G light beam. On the other hand, if the height H2 of the protruding sections becomes lower than 10 nm, the reflectance is shifted to be increased, and the peak of the decrease in the reflectance becomes gentler, thereby making it harder to absorb the unwanted polarized light. Further, if the height H2 of the protruding sections exceeds 50 nm, the peak of the absorption wavelength is shifted significantly toward the side of the longer wavelength, and the absorption wavelength band is shifted from the desired wavelength.

Further, by setting the pitch P2 of the protruding sections to no smaller than 575 nm and smaller than 675 nm, and the height H2 of the protruding sections to no smaller than 10 nm and no larger than 50 nm, the surface plasmon resonance can be developed with the R light beam. Since the specific linearly polarized light TE (the unwanted polarized light) out of the R light beam entering the polarization element can selectively be absorbed, an application to the polarization element for the R light beam is possible. For example, if the pitch P2 of the protruding sections becomes smaller than 575 nm, the peak of the absorption wavelength is shifted toward the shorter wavelength side, and enters the wavelength band of the G light beam. Further, if the pitch P2 of the protruding sections exceeds 675 nm, the peak of the absorption wavelength is shifted toward the longer wavelength side, and enters the wavelength band of infrared light. On the other hand, if the height H2 of the protruding sections becomes lower than 10 nm, the reflectance is shifted to be increased, and the peak of the decrease in the reflectance becomes gentler, thereby making it harder to absorb the unwanted polarized light. Further, if the height H2 of the protruding sections exceeds 50 nm, the peak of the absorption wavelength is shifted significantly toward the side of the longer wavelength, and the absorption wavelength band is shifted from the desired wavelength.

Further, since the pitch P2 of the protruding sections becomes shorter than the wavelength $\lambda$ of the incident light, the unwanted light can surely be absorbed. For example, in the case of using such a polarization element in projectors, no degradation in contrast is caused.

Then, a theoretical support for the fact that the pitch P2 of the protruding sections is preferably shorter than the wavelength of the incident light will be considered.

In the case in which the light enters the thin metal wires provided with the protruding sections, the angle of the diffracted light (the reflected diffracted light) of the light reflected by the thin metal wires is expressed by the following formula.

$$\sin \theta = m \cdot \lambda / P2 \qquad (2)$$

Here, "θ" denotes the diffraction angle (the angle with respect to the normal line of the interface the light enters), "m" denotes the order of diffraction (an integer), "λ" denotes the wavelength of the incident light, and "P2" denotes the pitch of the protruding sections. Assuming that the wavelength λ of the incident light is equal to 500 nm, the pitch P2 of the protruding sections is equal to 550 nm, and the order m of diffraction is equal to 1, for example, sin θ<1 is satisfied, and the reflected diffracted light occurs in the direction of θ=65.4°, as a result. Such reflected diffracted light becomes the stray light. For example, in the case of using such a polarization element in projectors, occurrence of the degradation in contrast is expected.

In contrast, if the pitch P2 of the protruding sections is set to be shorter than the wavelength λ of the incident light (λ>P), sin θ>1 is satisfied, and no reflected diffracted light occurs. Therefore, it is effective for absorbing the unwanted polarized light to make the pitch P2 of the protruding sections shorter than the wavelength λ of the incident light.

The entire disclose of Japanese Patent Application No. 2009-260713, filed Nov. 16, 2009 and 2010-161725, filed Jul. 16, 2010 are expressly incorporated by reference herein.

What is claimed is:

1. A polarization element comprising:
a substrate;
a plurality of thin metal wires provided to the substrate in a striped manner; and
a plurality of protruding sections made of metal provided to each of the thin metal wires, and arranged in a longitudinal direction of the thin metal wire at a pitch shorter than a wavelength of incident light.

2. The polarization element according to claim 1, wherein a width of each of the protruding sections in the longitudinal direction of the thin metal wire, and
a distance between two adjacent ones of the protruding sections are respectively the same between the adjacent ones of the thin metal wires.

3. The polarization element according to claim 1, wherein a distance from the thin metal wire to an upper surface of each of the protruding sections is set in accordance with the wavelength of the incident light.

4. The polarization element according to claim 1, wherein shapes of each of the thin metal wires and each of the protruding sections viewed from a direction parallel to a plane of the substrate are each a rectangular shape.

5. A projector comprising:
an illumination optical system adapted to emit a light beam;
at least one liquid crystal light valve adapted to modulate the light beam;
at least one polarization element according to claim 1 the light beam modulated by the liquid crystal light valve enters; and
a projection optical system adapted to project a polarized light beam transmitted through the polarization element on a projected surface.

6. The projector according to claim 5, wherein
the light beam emitted by the illumination optical system includes a plurality of colored light beams different in wavelength from each other,
the liquid crystal light valves are disposed so as to correspond respectively to the colored light beams, and
the polarization elements are different from each other in the distance from the upper surface of the thin metal wire to the upper surface of each of the protruding sections corresponding to the colored light beam modulated by the liquid crystal light valve, the thin metal wire and the protruding sections being included in each of the polarization elements.

7. A polarization element of a wire grid type, comprising:
a substrate;
a plurality of thin metal wires provided to the substrate in a striped manner; and
a plurality of protruding sections made of metal provided to each of the thin metal wires, and arranged in a longitudinal direction of the thin metal wire at a pitch of no smaller than 300 nm and no larger than 700 nm,
wherein the thin metal wires are arranged in a direction perpendicular to the longitudinal direction of the thin metal wire at a pitch of no smaller than 10 nm and no larger than 200 nm.

8. The polarization element according to claim 7, wherein the protruding sections are arranged in the longitudinal direction of the thin metal wire at a pitch of no smaller than 475 nm and smaller than 545 nm, and the height of each of the protruding sections is set to no lower than 10 nm and no higher than 50 nm.

9. The polarization element according to claim 7, wherein the protruding sections are arranged in the longitudinal direction of the thin metal wire at a pitch of no smaller than 380 nm and smaller than 450 nm, and the height of each of the protruding sections is set to no lower than 10 nm and no higher than 50 nm.

10. The polarization element according to claim 7, wherein the protruding sections are arranged in the longitudinal direction of the thin metal wire at a pitch of no smaller than 575 nm and smaller than 675 nm, and the height of each of the protruding sections is set to no lower than 10 nm and no higher than 50 nm.

11. The polarization element according to claim 7, wherein a width of each of the protruding sections in the longitudinal direction of the thin metal wire and a distance between two adjacent ones of the protruding sections are respectively the same between the adjacent ones of the thin metal wires.

12. The polarization element according to claim 7, wherein shapes of each of the thin metal wires and each of the protruding sections viewed from a direction parallel to a plane of the substrate are each a rectangular shape.

13. A projector comprising:
an illumination optical system adapted to emit a light beam;
at least one liquid crystal light valve adapted to modulate the light beam;
at least one polarization element according to claim 7 the light beam modulated by the liquid crystal light valve enters; and
a projection optical system adapted to project a polarized light beam transmitted through the polarization element on a projected surface.

14. The projector according to claim 13, wherein
the light beam emitted by the illumination optical system includes a plurality of colored light beams different in wavelength from each other,
the liquid crystal light valves are disposed so as to correspond respectively to the colored light beams, and the polarization elements are different from each other in the height of each of the protruding sections corresponding to the colored light beam modulated by the liquid crystal light valve, the protruding sections being included in each of the polarization elements.

15. The projector according to claim 13, wherein
the light beam emitted by the illumination optical system includes a plurality of colored light beams different in wavelength from each other,
the liquid crystal light valves are disposed so as to correspond respectively to the colored light beams, and
the polarization elements are different from each other in a pitch of the protruding sections corresponding to the colored light beam modulated by the liquid crystal light valve, the protruding sections being included in each of the polarization elements.

* * * * *